US008468445B2

(12) United States Patent
Gupta et al.

(10) Patent No.: US 8,468,445 B2
(45) Date of Patent: Jun. 18, 2013

(54) SYSTEMS AND METHODS FOR CONTENT EXTRACTION

(75) Inventors: Suhit Gupta, Redmond, WA (US); Gail Kaiser, Leonia, NJ (US); Salvatore J. Stolfo, Ridgewood, NJ (US)

(73) Assignee: The Trustees of Columbia University in the City of New York, New York, NY (US)

( * ) Notice: Subject to any disclaimer, the term of this patent is extended or adjusted under 35 U.S.C. 154(b) by 1023 days.

(21) Appl. No.: 11/395,579

(22) Filed: Mar. 30, 2006

(65) Prior Publication Data

US 2007/0050708 A1 Mar. 1, 2007

Related U.S. Application Data

(60) Provisional application No. 60/666,358, filed on Mar. 30, 2005.

(51) Int. Cl.
*G06F 17/00* (2006.01)
*G06F 9/45* (2006.01)

(52) U.S. Cl.
USPC ........... 715/234; 715/205; 715/255; 715/760; 717/115; 717/144

(58) Field of Classification Search
USPC ................. 715/200–202, 204, 205, 210, 226, 715/231, 234, 238, 239, 243, 253, 255, 256, 715/273, 274, 700, 713, 760, 762; 717/100, 717/105, 106, 111, 113, 114, 115, 143, 144, 717/162, 167
See application file for complete search history.

(56) References Cited

U.S. PATENT DOCUMENTS

| | | | | |
|---|---|---|---|---|
| 6,128,655 | A * | 10/2000 | Fields et al. | 709/219 |
| 6,647,396 | B2 * | 11/2003 | Parnell et al. | 707/695 |
| 6,704,726 | B1 * | 3/2004 | Amouroux | 707/999.004 |
| 6,738,951 | B1 | 5/2004 | Weiss et al. | |
| 6,785,685 | B2 * | 8/2004 | Soetarman et al. | 707/101 |
| 6,826,576 | B2 * | 11/2004 | Lulich et al. | 707/740 |
| 6,829,746 | B1 | 12/2004 | Schwerdtfeger et al. | |
| 6,868,423 | B2 * | 3/2005 | Ohta et al. | 707/102 |
| 7,047,297 | B2 * | 5/2006 | Huntington et al. | 709/224 |

(Continued)

FOREIGN PATENT DOCUMENTS

| | | |
|---|---|---|
| WO | WO 0223741 | 3/2002 |
| WO | WO 2005024668 | 3/2005 |

OTHER PUBLICATIONS

Gupta et al., "Automating Content Extraction of HTML Document", Online version published in Dec. 2004, pp. 179-219.*

(Continued)

*Primary Examiner* — Maikhanh Nguyen
(74) *Attorney, Agent, or Firm* — Bryne Poh LLP

(57) ABSTRACT

A content extraction process may parse markup language text into a hierarchical data model and then apply one or more filters. Output filters may be used to make the process more versatile. The operation of the content extraction process and the one or more filters may be controlled by one or more settings set by a user, or automatically by a classifier. The classifier may automatically enter settings by classifying markup language text and entering settings based on this classification. Automatic classification may be performed by clustering unclassified markup language texts with previously classified markup language texts.

21 Claims, 11 Drawing Sheets

U.S. PATENT DOCUMENTS

| | | | |
|---|---|---|---|
| 7,082,429 B2 * | 7/2006 | Lin et al. ................ | 707/710 |
| 7,249,352 B2 * | 7/2007 | Fleming et al. ............ | 717/162 |
| 7,277,885 B2 * | 10/2007 | Eppley et al. ............. | 1/1 |
| 7,321,880 B2 * | 1/2008 | Gosby ..................... | 706/20 |
| 7,415,538 B2 * | 8/2008 | Maes et al. ............... | 709/246 |
| 7,469,251 B2 * | 12/2008 | Li et al. ................. | 707/999.005 |
| 7,480,858 B2 * | 1/2009 | Chen et al. ............... | 715/234 |
| 7,581,170 B2 * | 8/2009 | Baumgartner et al. ........ | 715/234 |
| 7,584,181 B2 * | 9/2009 | Zeng et al. ............... | 707/5 |
| 7,725,875 B2 * | 5/2010 | Waldrep ................... | 717/106 |
| 2002/0007379 A1 | 1/2002 | Wang et al. | |
| 2002/0016801 A1 * | 2/2002 | Reiley et al. ............. | 707/523 |
| 2002/0091835 A1 | 7/2002 | Lentini et al. | |
| 2002/0143821 A1 | 10/2002 | Jakubowski | |
| 2003/0018646 A1 | 1/2003 | Ohta et al. | |
| 2003/0074400 A1 * | 4/2003 | Brooks et al. ............. | 709/203 |
| 2003/0088639 A1 * | 5/2003 | Lentini et al. ............ | 709/217 |
| 2003/0110272 A1 * | 6/2003 | du Castel et al. .......... | 709/229 |
| 2003/0229854 A1 * | 12/2003 | Lemay ..................... | 715/513 |
| 2004/0015775 A1 | 1/2004 | Simske et al. | |
| 2005/0022115 A1 * | 1/2005 | Baumgartner et al. ........ | 715/513 |
| 2005/0060647 A1 | 3/2005 | Doan et al. | |
| 2005/0066269 A1 * | 3/2005 | Wang et al. ............... | 715/513 |
| 2005/0097453 A1 * | 5/2005 | Simonyi ................... | 715/513 |
| 2005/0182756 A1 * | 8/2005 | Eppley et al. ............. | 707/3 |
| 2006/0282409 A1 * | 12/2006 | Waldrep ................... | 707/3 |
| 2006/0288275 A1 * | 12/2006 | Chidlovskii et al. ........ | 715/513 |
| 2007/0198727 A1 * | 8/2007 | Guan ...................... | 709/228 |

OTHER PUBLICATIONS

Gupta et al. "DOM-based Content Extraction of HTML Document", ACM, pp. 207-214, May 20-24, 2003.*

Avant Browser Website, 2004, available at: http://avantbrowser.com/.

Bitstream Website, "A Wireless Web Browser from Bitstream—ThunderHawk", 2004, available at: http://www.bitstream.com/wireless/.

Boulton, L.M., "A Clinical Evaluation of Equipment Which Allows the Partially Sighted and Blind to Access Computer-Based Information", In Australian and New Zealand Journal of Ophthalmology, vol. 17, No. 1, Feb. 1989, pp. 87-93.

Boulton, L.M., "Computer Hardware and Software to Assist the Visually Impaired and Blind", In Australian and New Zealand Journal of Ophthalmology, vol. 21, No. 1, Feb. 1993, pp. 7-14.

Creasey, T., "Designing Accessible Plug-ins in Eclipse", May 20, 2003, available at: http://www.eclipse.org/articles/article.php?file=Article-Accessibility/index.html.

Dolphin Computer Access Website, 2004, available at: http://www.dolphinuk.co.uk/products/hal.htm.

Greenlight Wireless Services Website, 2004, available at: http://www.greenlightwireless.net/services/default.asp.

Gupta, S., "Context-Based Content Extraction of HTML Documents", Doctoral Thesis, Columbia University, 2006, pp. 1-204.

Hogue, A.W., "Tree Pattern Inference and Matching for Wrapper Induction on the World Wide Web", Master's Thesis, Massachusetts Institute of Technology, Jun. 2004, pp. 1-106.

IBM, "IBM Home Page Reader 3.0", 2004, available at: http://www-3.ibm.com/able/solution_offerings/hpr.html.

Junkbuster Proxy Website, 2004, available at: http://www.junkbuster.com/.

Kushniruk, A.W., et al., "Assessment of a Computerized Patient Record System: A Cognitive Approach to Evaluating Medical Technology", M.D. Computing : Computers in Medical Practice, vol. 13, No. 5, Sep.-Oct. 1996, pp. 406-415.

Northover, S., "SWT: The Standard Widget Toolkit", Mar. 22, 2001, available at: http://www.eclipse.org/articles/Article-SWT-Design-1/SWT-Design-1.html.

Promotion Data, "Pages with the Highest Google PageRank", Nov. 5, 2002, available at: http://www.promotiondata.com/article.php?sid=190.

SourceForge, "Project: Web Page Advertisement Removal Summary", 2004, available at: http://sourceforge.net/projects/wpar.

Turnbull, S.B., "People with Disabilities and the National Information Infrastructure (NII)", In the Information Infrastructure: Reaching Society's Goals Report of the Information Infrastructure Task Force Committee on Applications and Technology, Sep. 7, 1994, pp. 1-18.

WebAIM, "Screen Reader Simulation", 2004, available at: http://webaim.org/simulations/screenreader.

WebWiper Website, 2004, available at: http://www.webwiper.com/.

Altman. R. B., "Informatics in the Care of Patients: Ten Notable Challenges." West J Med 166: 118-22, 1997.

Argamon, S., Koppel, M., Avneri, G., "Routing Documents According to Style.", International Workshop on Innovative Information Systems, 1998.

Aslam, J., Pelehov, E., and Rus, D., "A Star Clustering Algorithm for Static and Dynamic Information Organization", Journal of Graph Algorithms and Applications. vol. 8 No. 1, 2004.

Bauer, T. and Leake, D., "WordSieve: A Method for Real-Time Context Extraction."Modeling and Using Context: Proceedings of the Third International and Interdisciplinary Conference, Context 2001, Springer-Verlag, 2001.

Blanck, P. D. And Sandler, L.A., "ADA Title III and the Internet: Technology and Civil Rights."Ment Phys Disabil Law Rep 24: 855-9. 2000.

Brin S., et al., "The Anatomy of a Large-Scale Hypertextual Web Search Engine." Computer Networks and ISDN Systems, 1998, 30, 107-117.

Brown, C. "Assistive Technology Computers and Persons with Disabilities." Communications of the ACM 35: 36-45, 1992.

Brown, G. C., "Vision and Quality of Life." Trans Am Opthamol Soc 97: 473-511, 1999.

Brown, M. et al., "A New Paradigm for Browsing the Web", Human Factors in Computing Systems, 1995.

Buyukkokten, O. et al., "Accordion Summarization for End-Game Browsing on PDAs and Cellular Phones", Proc. of Conf. on Human Factors in Computing Systems, 2001.

Buyukkoketn, O. et al., "Seeing the Whole in Parts: Text Summarization for Web Browsing on Handheld Devices"Proc. of 10th Int. World-Wide Conf., 2001.

Buyukkokten, O. et al., "Text Summarization for Web Browsing on Handheld Devices". Proc. of 10th Int. World-Wide Web Conf., 2001.

Chen, Y., et al., "Detecting Web Page Structure for Adaptive Viewing on Small Form Factor Devices," Proc. WWW Budapest, Hungary, 2003.

Chiang, M. et al., "World Wide Web Accessibility by Visually Disabled Patients: Problems and Solutions," Final Report for CS6125 WHIM, 2005.

Chiang, M. F. and Starren, J., "Evaluation of Consumer Health Website Accessibility by Users with Sensory and Physical Disabilities." MedInfo 2004, in press.

Chisolm, W., et al., "Computer and Web Content Accesibility Guidelines 1.0," Interactions, 2001, 8. 35-54.

Christian, K., Kules, B., Shneiderman, B., and Youssef, A., "A Comparison of Voice Controlled and Mouse Controlled Web Browsing," In Proceedings of the Fourth International ACM Conference on Assistive Technologies. New York, ACM Press, 2000, pp. 72-79.

Crammer, K., Kandola, J., and Singer, Y., "Online Classification on a Budget", Seventeenth Annual Conference on Neural Informatin Processing Systems, 2003.

Cutting, D., Karger, D. Pederson, J., and Tukey, J., "Scatter/Gather: A Cluster-Based Approach to Browsing Large Document Collection", Proceedings of the SIGIR '92, 15th ACM International Conference on Research and Development in Information Retrieval, 1992.

Devine, E. G., Gaehde, S. A., and Curtis, A. C., "Comparative Evaluation of Three Continuous Speech Recognition Software Packages in the Generation of Medical Reports." J Am Med Inform Assoc 7: 462-8, 2000.

Edwards. W. K., Mynatt, E. D., and Stockton, K., "Access to Graphical Interfaces for Blind Users." Interactions 1995; 2:54-67.

Faye, E. E., "Maintaining Visual Functions in the Elderly," Bull NY Acad Med 60: 867, 967-93, 1984.

Finn, A. et al., "Fact or fiction: Content classification for digital libraries", Joint DELOS-NSF Workshop on Personalization and Recommender Systems in Digital Libraries. 2001, Dublin.

Fraser, J. and Gutwin, C., "A Framework of Assistive Pointers for Low Vision Users," In Proceedings of the Fourth International ACM Conference on Assistive Technologies, New York, ACM Press, 2000. pp. 9-16.

Frykholm, "Web design hampers mobile internet, pioneer says," Reuters, Mar. 17, 2005.

Gerber, E. and Kirchner, C., "Who's Surfing? Internet Access and Computer Use by Visually Impaired Youths and Adults." Journal of Visual Impairment and Blindness 95: 176-81, 2001.

Gunderson, J., "Americans with Disabilities Act (ADA): Human Computer Interaction and People with Disabilities," In Conference Companion on Human Factors in Computing Systems. ACM Press, 1994. pp. 381-382.

Gupta, S., et al., "Automating Content Extraction of HTML Documents," http://www.psi.cs.columbia.edu/crunch/WWWJ.pdf.2004.

Gupta, S., et al., "CRUNCH—Web-Based Collaboration for Persons with Disabilities," 2003.

Gupta, S., et al., "DOM-Based Content Extraction of HTML Documents." http://www.psi.cs.columbia.edu/crunch/www2003.pdf, 2003.

Gupta, S., et al., "Extracting Content from Accessible Web Pages," http://www.ra.ethz.ch/CDstore/www2005-ws/workshop/wf01/26-Gupta.pdf, 2005.

Gupta, S., et al., "Genre Classification of Websites Using Search Engine Snippets," http://www.cs.columbia.edu/techreports/cucs-004-05.pdf, 2005.

Gupta, S., Kaiser, G., and Stolto, S., "Extracting Context to Improve Accuracy for HTML. Content Extraction" Columbia University TR CUCS-045-04, 2004—http://www1.cs.columbia.edu/-library/TR-repository/reports-2004/cucs-045-04.pdf.

Hanzlik, S. et al., "Gorilla Design Studios Presents: The Hosts File", Gorilla Design Studios, 2002.

Henricks, W. H., Roumina, K., Skitton, B. E. et al., "The Utility and Cost Effectiveness of Voice Recognition Technology in Surgical Pathology." Mod Pathol 15: 565-71, 2002.

Institute for Health and Aging, University of California, San Francisco, "Chronic Care in America: A 21st Century Challenge." Princeton, NJ, Robert Wood Johnson Foundation, 1996.

Jacko, J. A. and Sears, A., "Designing Interfaces for an Overlooked User Group: Considering the Visual Profiles of Partially Sighted Users." In Proceedings of the Third International ACM Conference on Assistive Technologies. New York, ACM Press, 1998, pp. 75-77.

Jacko, J. A., Baretto, A. B., Marmet, G. J., et al. "Low Vision: The ROle of Visual Activity in the Efficiency of Cursor Movement," in Proceedings of the Fourth International ACM Conference of Assistive Technologies. New York, ACM Press, 2000, pp. 1-8.

Jacko, J. A., Dixon, M. A., Rosa, R. H., et al, "Visual Profiles: A Critical Compenent of Universal Access," in Proceedings of the SIGCHI Conference on Human Factors in Computing Systems. New York, ACM PRess, 1999. pp. 330-337.

Kaasinen, E. et al., "Two Approaches to Bringing Internet Services to WAP Devices", Proc. of 9th Int. World-Wide Web Conf., 2000.

Kan, M., et al., "Linear Segmentation and Segment Relevance," Proc. of 6th Int. Workshop of Very Large Corporations, 1998.

Karlgren, J. "Stylistic Experiments in Information Retrieval." Natural Language Information Retrieval. Kluwer, 1990.

Karlgren, J., Bretan, I., Dewe, J., Hallberg, A., and Wolkert, N., "Interative Information Retrieval Using Fast Clustering and Usage-Specific Genres." DELOS Workshop on User Interfaces in Digital Libraries, pp. 85-92, Stockholm, Sweden, 1998.

Kessler, B., Nunberg, G., and Schutze, H., "Automatic Detection of Text Genre." ACL/EACL, 1997.

Kline, R. L., et al., "Improving GUI Accessibility for People with Low Vision." Human Factors in Computing Systems, 1995.

Kunze, M. et al., "An XML-based Approach for the Presentation and Exploitation of Extracted Information", 19th Int. Conf. on Computational Liguistics, 2002.

Kushniruk, A. W., et al.. "Usability Evaluation of an Experimental Text Summarization System and Three Search Engines: Implications for the Re-Engineering of Health Care Interfaces," Proc. AMIA Symp. 2002. 420-424.

Kushniruk, A. W., et al., "Usability Testing in Medical Informatics: Cognitive Approaches to Evaluation of Information Systems and USer Interfaces." Proc. AMIA Symp., 1997. 218-222.

Landner, R. E., "Computer Accessibility for Federal Workers with Disabilities: It's the Law." Communications of the ACM 32: 952-65, 1989.

Laux, L. F., McNally, P. R., Paciello, M. G., and Vanderheiden, G. C., "Designing the World Wide Web for People with Disabilities: A User Centered Design Approach." in Proceedings of the Second Annual ACM Conference on Assistive Technologies, New York, ACM PRess, 1996, pp. 94-101.

Lee, Y. B. and Myaeng, S., "Text Genre Classification with Genre-Revealing and Subject-Revealing Features", Proceedings of SIGR '02, 25th ACM International Conference on Research and Development in Information Retrieval, 2002.

Lewis, C., "Using the 'Thinking-Aloud' Method in Cognitive Interface Design,"IBM Research Report, 1982.

Li, T., Ma, S., and Ogihara, M., "Document Clustering via Adaptive Subspace Iteration", Proceedings of SIGR '40, 27th ACM International Conference on Research and Development in Information Retrieval, 2004.

Licklider, J. C. R. and Clark, W., "On-Line Man Computer Communication." Proceedings Spring Joint Computer Conference 21, 113-28, 1962.

McKeown, K. R. et al., "Columbia Multi-document Summarization: Approach and Evaluation", 2001.

Muslea, I., et al., "A Hierachal Approach to Wrapper Induction," Proc. of 3rd Int. Conf. on Autonomous Agents, 1999.

Ng, A., Jordan, M., and Weiss, Y., "On Spectral Clustering Analysis and an Algorithm", In Advances in Neural Information Processing Systems, 2001.

Pitt, I. J., and Edwards, A. D. N., "Improving the Usability of Speech Based Interfaces for Blind Users." In Proceedings of the Second Annual ACM Conference on Assistive Technologies (ASSETS). 1996.

Rahman, A. F. R et al., "Content Extraction from HTML Documents". 1st Int. Workshop on Web Document Analysis, 2001.

Rahman, A. F. R. et al., "Understanding the Flow of Content in Summarizing HTML Documents", Int. Workshop on Document Layout Interpretation and its Applications, 2001.

Rauber, A. and Muller-Kogler, A., "Integrating Automatic Genre Analysis into Digital Libraries."Joint Conf. on Digital Libraries, 2001.

Reichl, W., et al., "Language Modeling for Content Extraction in Huma-Computer Dialogues," Int. Conf. on Spoken Language Processingm, 1998.

Roberts, I. G., "Multiple Computer Networks and Inter-Computer Communications." in Proceedings of the First ACm Symposium on Operating System Principles. New York, ACM Press, 1967, pp. 31-36.

Robertson, J., "So What is a Content Management System?" KM Column, June 2003.

Roussinov, D., Crosswell, K., Nilan, M., Kwasnik, B., Cai, J., and Liu, X., "Genre Based Navigation of the Web." International Conference on System Sciences, 2001.

Scott, I. U., Feuer, W. J., and Jacko, J. A. "Impact of Visual Function on Computer Task Accuracy and Reaction Time in a Cohort of Patients with Age-Related Macular Degeneration." AM J Opthalmol 133: 350-7, 2002.

Scott, I. U., Feurer, W. J., and Jacko, J. A., "Impact of Graphical User Interface Screen Features on Computer Task Accuracy and Speed in a Cohort of Patients with Age-Related Macular Degeneration." Am J Ophthalmol 2002: 134: 857-862.

Scott, I. U., Schein, O. D., West, S., et al, "Functional Status and Quality of Life Measurement Among Ophthalmic Patients," Arch Ophthalmol 112: 329-35, 1994.

Sebastiani, F., "Text Categorization", In Allesandro Zanasi (3d.), Text Mining and its Applicatons, WIT Press, Southampton, UK, 2005.

Shen, D., Chen, Z., Yang, Q., Zeng, H. J., Zhang, B., Lu, Y., and Ma, W.-Y,, "Web-Page Classification through Summarization", Proceedings of SIGIR '04, 27th ACM International conference on Research and Development in Information Retrieval, 2004.

Scheiderman. B., "Universal Usability: Pushing Human-Computer Interaction Research to Empower Every Citizen." Communications of the ACM 43: 84-91, 2000.

Shoemaker, J. A., "Vision Problems in the US: Prevalence of Adult Vision Impairment and Age-Related Eye Diseases in America." Bethesda, MD: National Eye Institute, 2002.

Sierkowski, B., "Achieving Web Accessibility," in Proceedings of the 30th Annual ACM SIGUCCS Fall Conference on User Services Conference. New York. ACM Press, 2002. pp. 288-291.

Siersdorfer, S. and Sizov, S., "Restrictive Clustering and Metaclustering for Self-Organizing Document Collections", Proceedings of SIGIR '04, 27th ACM International Conference on Research and Development in Information Retrieval, 2004.

Slonim, N., Friedman, N., and Tishby, N., "Unsupervised Document Classification Using Sequential Information Maximization", Proceedings of SIGIR '02. 25th ACM International Conference on Research and Development in Information Retrieval, 2002.

Stamatatos, E., Fakotakis, N., and Kokkinakis, G., "Text Genre Detection Using Common Work Frequencies." International Conference on Computational Linguistics, 2000.

Sullivan, T. and Matson, R., "Barriers to Use: Usability and Content Accessibility on the Web's Most Popular Sites," in Proceedings of the Conference on Universal Usability. New York, ACM Press. 2000, pp. 139-144.

Tielsch, J. M., Sommer, A., Witt, K., et al. Blindness and Visual Impairment in an American Urban Population: The Baltimore Eye Survey, Arch Opthalmol 108: 286-90, 1990.

Van Rijsbergen, C. J., "Information Retrieval". Butterworths, London, 2nd ed., 1979.

Vanderheiden, G., "Fundamental Principles and Priority Setting for Universal Usability," in Proceedings of the Conference on Universal Usability. New York, ACM Press. 2000, pp. 32-37.

Wacholder, N. et al., "Automatic Identification and Organization of Index Terms for Interactive Browsing", Joint Conf. on Digital Libraries, 2001.

Welsh, M., et al., "The Staged Event-Driven Architecture of Highly-Concurrent Server Applications." Ph. D. Qualifying Examination Proposal, UC Berkley, 2000.

Willett, P., "Recent Trends in Hierarchis Document Clustering: A Critical Review", Journal Information Processing and Management, 1988.

Xu, W., Liu, X., and Gong, Y., "Document Clustering Based on Non-Negative Matrix Factorization", Proceedings of SIGIR '3, 26th ACM International Conference on Research and Development in Information Retrieval, 2003.

Yang, Y., Zhang, J., Kisiel, B., "A Scalability Analysis of Classifiers in Text Categorization", Proceedings of SIGIR '03, 26th ACM International Conference on Research and Development in Information Retrieval, 2003.

Zamir, O. and Etzioni, O., "A Dynamic Clustering Interface to Web Search Results", Proceedings of the Eigth World Wide Web Conference, 1999.

Zamir, O., Etzioni, O., "Web Document Clustering: A Fessibility Demonstration", SIGR 1996.

Zhang, T., Ramakrishnan, R., and Livny, M., "BIRCH: An Efficient Data Clustering Method for Very Large Databases", ACM SIGMOD International Conference on Management of Data. 1996.

Zick, R. G. and Olsen, J., "Voice Recognition Software Versus a Traditional Transcription Service for Physician Charting in the ED." Am J Emerg Med 19: 295-8, 2001.

"Complete List of Web Accessibility Evaluation Tools", W3C World Wide Web Consortium, Mar. 17, 2006, available at: www.w3.org/WAI/ER/existingtools.html.

"Welcome to the HiSoftware Cynthia Says Portal", ContentQuality.com, Mar. 23, 2006, available at: http://www.contentquality.com/Default.asp.

Caldwell, B., et al., "Web Content Accessibility Guidelines 2.0", Technical Report, W3C World Wide Web Consortium, Nov. 23, 2005, available at: http://www.w3.org/TR/WCAG20/complete.html.

* cited by examiner

SYSTEMS AND METHODS FOR CONTENT EXTRACTION

CROSS-REFERENCE TO RELATED APPLICATIONS

This application claims the benefit under 35 U.S.C. §119(e) of U.S. Provisional Patent Application No. 60/666,358, filed on Mar. 30, 2005, entitled "Automating Content Extraction of HTML Documents," which is hereby incorporated by reference herein in its entirety.

FIELD OF THE INVENTION

The present invention relates to the field of data processing, and more specifically to the field of automatic content extraction from input data.

BACKGROUND OF THE INVENTION

Overview of the Internet and the Services Available

The Internet connects many different types of computers providing a variety of services to other computers. Those providing services are generally referred to as servers, while those requesting services are generally referred to as clients. Examples of the services provided on the Internet are web services provided through the Hyper Text Transfer Protocol (HTTP), email provided through the Post Office Protocol, Gopher, and Wide Area Information Servers (WAIS).

Any of these services may be used to provide markup language text to a client. The term "markup language" is used to refer to any type of formatted content, such as content using tags for formatting and/or organization. "Markup language text" refers to any content formatted in a particular markup language. One example of a markup language that is widely available on the Internet is the Hypertext Markup Language (HTML). Servers that provide HTML are generally called web servers and the HTML they provide are called websites. However, computers that provide other types of markup languages such as Wireless Markup Language (WML), Extensible Markup Language (XML) or Mathematical Markup Language (MathML) are sometimes also referred to as websites. The types of content described above, HTML, WML and XML, are only examples of the different types of markup languages available. Many other types also exist and new types continue to be developed for new applications and new devices.

Users are spending more time on the Internet performing more and more activities from online shopping to banking; meanwhile, Internet sites are getting more complex in design and content. For example, one common way of performing activities on the Internet is through webpages, which are HTML pages provided by a server. Websites are simply a collection of webpages, and the term website can also be used to refer to a collection WML, XML or any type of markup language text provided by a server.

Problems Associated with Current Websites

Websites are becoming more cluttered with guides and menus attempting to improve the user's efficiency, but instead these guides and menus often end up distracting from the actual content of interest. These "features" may include script- and flash-driven animation, menus, pop-up ads, obtrusive banner advertisements, unnecessary images, or links scattered around the screen.

These features have caused the gap between the usability of the web for persons with disabilities vs. persons without disabilities to grow ever wider. Many of these technologies were designed to better the web experience for sighted users, including script- and flash-driven animation, pop-ups, banners, and of course, images. While some users may find these features effective, they may make websites less accessible to users with disabilities. The World Wide Web Consortium (W3C) has created a set of guidelines, the Web Accessibility Initiative, to assist web developers in creating sites that are accessible to all.

As an example, FIG. 5 shows a typical sports webpage from CNN Sports Illustrated. It not only contains the article 5020 (the text on the left of the screen), but also has a number of clutter elements like the advertisement 5040 on the right, the horizontal banner ad 5010 immediately under the logo and the advertisement links 5030, below the image that is related to the article. There are several corporate logos identifying the site, as well as ones for the web page. There are also several elements intended to help with navigation of the site itself and while there are no menu bars (vertical or horizontal) in this example, such menu bars are found on many webpages.

On websites such as shown in FIG. 5, speech rendering via screen readers, used by visually impaired users trying to access web pages, often end up reading the raw HTML rather than the content between them. The problem worsens with handheld devices where precious bandwidth and time may be wasted on downloading and then rendering the clutter which the user is likely to scroll past without reading.

Cluttered websites is a serious issue because the number of visually impaired web users (and computer users in general) is expected to increase dramatically as the population continues to age. For example, it is estimated that the number of Americans over the age of 65 will double between 2000 and 2040. In 1997, the United States Census Bureau estimated that there were 7.7 million adults with "non-severe visual limitation," which was defined as "difficulty with seeing words and letters, even with eyeglasses," and 1.8 million American adults with "severe visual limitation," which was defined as the "inability to see words and letters, even with eyeglasses". Persons with even minimal visual impairment are likely to encounter problems in everyday life. For example, people with vision worse than 20/40 cannot obtain an unrestricted driver's license in most states and may require assistive devices such as magnifiers for reading.

Overview of Content Extraction

One solution to this problem of cluttered websites that are inaccessible to disabled people is context extraction and content reformatting. A common reformatting practice for improving webpage accessibility for the visually impaired is to increase font size and decrease screen resolution; however, this also increases the size of clutter, reducing efficiency.

Another solution for making websites more accessible is screen readers for the blind. Screen readers convert the visual content of a webpage into audible content so that a user can hear it. However, these screen readers generally do not remove clutter from websites and often read out raw markup language text. Content extraction allows screen readers to process only the extracted content, instead of using either cluttered data from the web, or writing specialized extractors for each web domain.

The automatic extraction of useful and relevant content from webpages has many other applications in addition to assisting visually disabled users. These applications include enabling end users to access the web more easily over constrained devices like PDAs and cellular phones, providing less noisy data for information retrieval and summarization algorithms, and generally improving the web surfing experience.

Traditional approaches to removing clutter or making content more readable include removing images, disabling JavaScript, etc., all of which eliminate a webpage's original look-and-feel. Many of the products applying these approaches also rely on hardcoded techniques for certain common webpage designs as well as fixed "blacklists" of advertisers. These hardcoded techniques are inflexible and cannot easily be applied to websites they were not hardcoded for or to websites that have undergone structural changes.

SUMMARY OF THE INVENTION

Embodiments of the present invention relate to a method for extracting content from markup language text. A first embodiment of the invention parses markup language text into a hierarchical data model and applies one or more filters to the model to extract the desired content. One filter that may be applied removes content using a ratio of the number of links to the number of non-linked words. Another filter removes particular kinds of content such as programming script and video. Content corresponding to any of the content filtered out may also be added back to the model in order to maintain the usability and the original information contained with the markup language text. The operation of the content extraction and filtering may be controlled by one or more settings that can be determined automatically, or by a user. Finally, after processing, one or more output filters can be applied to make the hierarchical data model more useful to a variety of clients.

In a second embodiment of the invention, a classifier automatically determines the settings for a context extractor and a plurality of filters by classifying the markup language text to be processed. One method used for classifying an unknown markup language text is by clustering it with other known texts. In a further embodiment, the classifying operates by retrieving from one or more data repositories data associated with the Internet domain storing the markup language text. An identifier is then computed based on this associated data, and a measure of similarity between this computed identifier and previously classified identifiers is made. Based upon the classification of a markup language text, the appropriate settings for a filter are loaded.

BRIEF DESCRIPTION OF THE DRAWINGS

Various objects, features and advantages of the present invention can be more fully appreciated with reference to the following detailed description of the invention when considered in connection with the following drawings, in which like reference numerals identify like elements.

FIG. 6 is the webpage of FIG. 5 after some embodiments of the invention have been applied.

DETAILED DESCRIPTION OF EMBODIMENTS OF THE INVENTION

The Content Extraction System

Although some embodiments of the present invention are being described in the context of the web, websites and HTML content, the invention is not so limited. One of ordinary skill in the art will immediately recognize the applicability to any markup language, such as those described above, and to markup language text provided by a variety of sources, such as any Internet server and local files. Embodiments of the invention are just as applicable to XML pages served by a Gopher server or MathML pages served by an online database of mathematical journals, as to the more widely available webpages served from a web server.

The term "Internet domain" is used throughout the specification and drawings to refer to an identifier for a particular server. On the Internet this identifier may be called a domain name or a uniform resource locator. As a substitute, a server's Internet Protocol (IP) address may be used to identify a particular server, if the server is connected using the IP protocol. In other network environments, for example a Microsoft Windows network, an Internet domain could be substituted with a computer name as used within the Microsoft networking protocols. The Internet domain may also be used to refer to an identifier that signifies the source of markup language text being processed, for example, an author, publisher, or retailer of the material.

Figure 1:
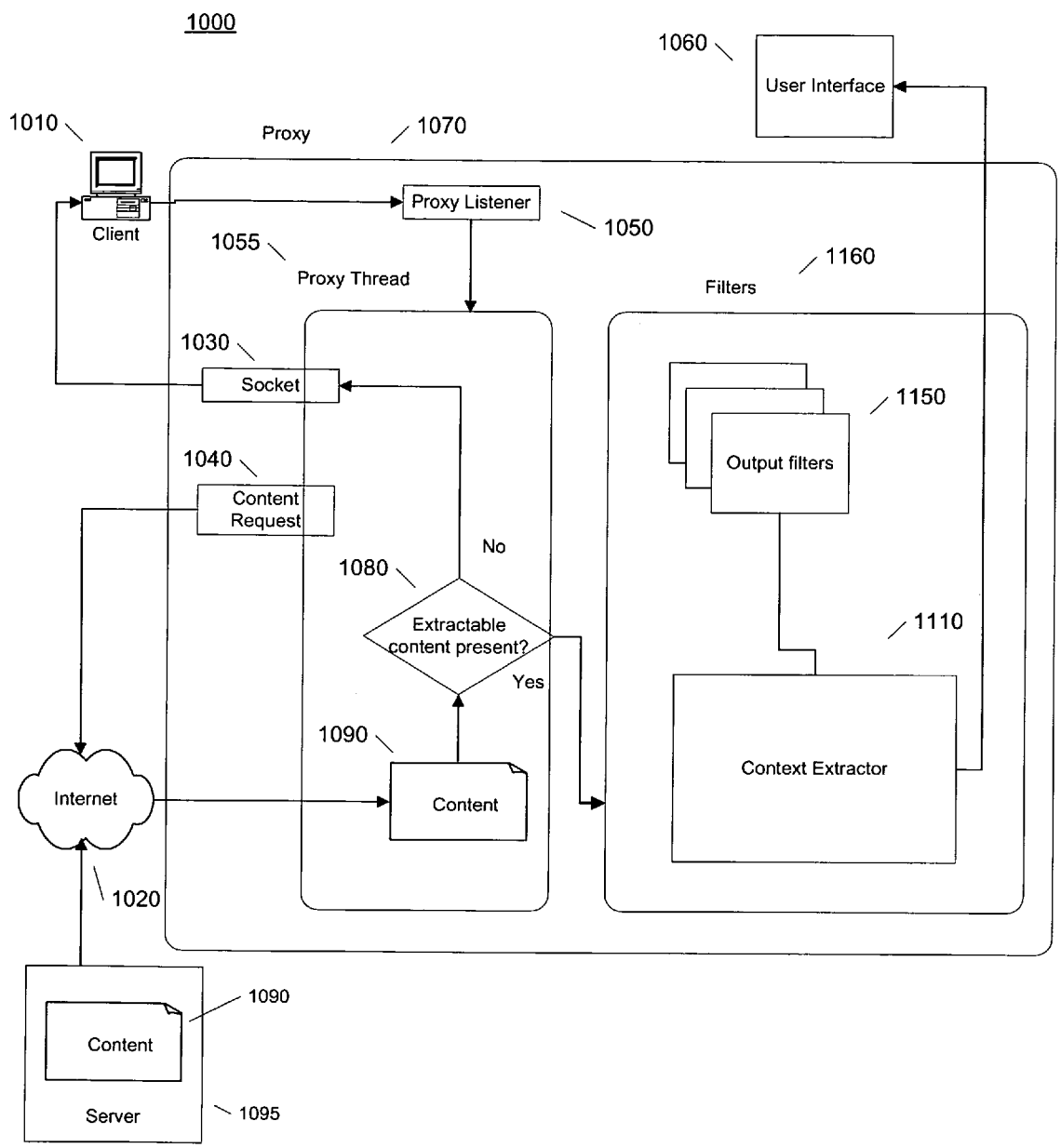
FIG. 1 is an example of a system diagram showing an overall system for applying some embodiments of the present invention.

FIG. 1 is an example of a system diagram showing an overall system 1000 for applying some embodiments of the present invention.

A client computer 1010 is shown connected to proxy 1070. Client computer 1010 can be any type of client, such as, a desktop or laptop computer, a mobile device, or a software module embedded within another system. Proxy 1070 may be any suitable device for performing the functions described below, such as a networked computer. Proxy 1070 performs as proxy listener function 1050.

Proxy listener 1050 waits and listens for requests from clients for content. After a client request is received, proxy listener spawns a proxy thread 1055. This proxy thread then handles the client request. The use of a threaded system is only one method for handling client requests, and any other suitable method may be used.

Proxy thread 1055 sends a content request 1040 to the Internet 1020 to retrieve the content 1090 that was identified in the client request. The content may be provided by server 1095. The retrieved content 1090 is then analyzed at block 1080 to determine whether the content has extractable content present. Depending on the type of content requested by the client, the content extraction system may or may not, be used to, process such content. For example, the user of the system may not have enabled processing of images, in which case they may be sent directly back to the client or removed from the processed content. However, if image processing is enabled, the system may include modules for reformatting and/or reducing the size of images to make them easier to view on small screens, or otherwise aid people with visual disabilities. Similar processing may be available for programming script, video content or animation.

If the content cannot be processed then it may be sent back to client 1010 through socket 1030. If the content can be processed, then it may be sent to content extractor 1110 which contains a number of modules for processing the requested content as described in more detail with reference to FIG. 2.

Both content extractor 1110 and output filters 1150 are shown as forming filters 1160 that represent a collection of filters that can be applied to process a client request.

Output filters 1150 represent additional filters and processing modules that can be applied after the content extractor has finished processing the requested content. These filters may convert the input from one markup language to another, compress the output, and perform encryption or any number of other services. These additional services may allow the content extractor to be used in more contexts and provide service to a larger number and variety of clients. One skilled in the art will recognize that the functions of the output filter can also be incorporated into the content extractor.

Input filters, not shown, may be contained in filters 1160. Input filters may be used to prepare the content for processing by the content extractor 1110 if necessary for a particular content 1090.

Figure 2:
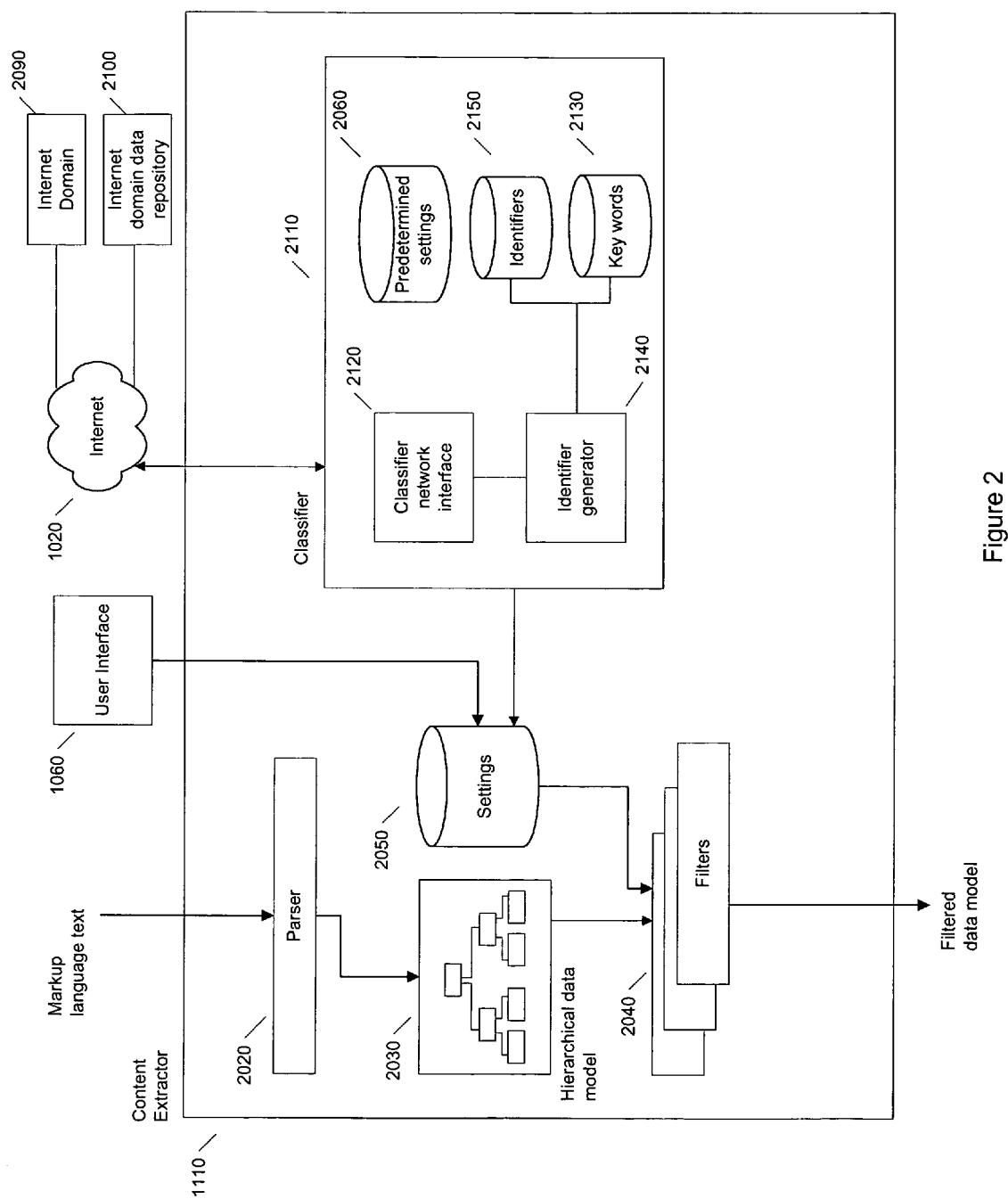
FIG. 2 is an example of a system diagram showing additional details of the content extractor and classifier in accordance with some embodiments of the present invention.

FIG. 2 is an example of a system diagram showing additional details of the content extractor and classifier 2000 in accordance with some embodiments of the present invention. Content extractor 1110 contains a parser 2020, hierarchical data model 2030, filters 2040, settings 2050, and classifier 2110.

The content extractor receives markup language text for processing and outputs a filtered data model. Alternatively, content extractor 1110 may also contain processing modules for non-text content, or may output text directly to output filters instead of outputting a hierarchical data model.

The markup language text that corresponds to a client's request is first input into parser 2020 to be converted into a hierarchical data model 2030 or any suitable data model. The parser can be any suitable parser such as OpenXML or NekoHTML. NekoHTML is an HTML scanner and tag balancer that parses HTML for Xerces, an XML implementation that is part of the Apache project. The parser receives markup language text and outputs a hierarchical data model. For example, NekoHTML is capable of receiving HTML and outputting a Document Object Model (DOM) tree. The parser may also correct errors in the markup language text. Such errors are commonly present in HTML provided by websites, however, most popular browsers like Internet Explorer and Mozilla are able to handle incorrect HTML by making the closest guess as to what the HTML should be.

DOM is a W3C standard that allows programs to work with documents in a platform and language independent manner. Using DOM trees in the content extraction process allows the extraction of information from large logical units as well as smaller units, such as specific links within the structure of the DOM tree. In addition, DOM trees are highly transformable and can be easily used to reconstruct a complete webpage. Finally, increasing support for the Document Object Model makes embodiments of the invention widely portable.

The filtering process of the content extractor implemented by filter 2040 may be implemented as a multi-pass filtering system where the resulting hierarchical data model produced after each stage of filtering is compared to the original copy. If too much or too little content has been removed, then the settings can be changed and/or the changes from the last filter pass can be discarded. This determination can be made based on the settings for the content extractor. Further, this determination of the acceptability of the output after each filter pass may be used to ensure that the content extractor does not return a null output with link-heavy pages.

Filters 2040 can be grouped into two sets. The first set of filters may simply ignore tags or specific attributes within tags, but keep track of the tags or attributes in memory. With these filters, images, links, scripts, styles, and many other elements can be quickly removed from a webpage. The second set of filters is more complex and algorithmic, providing a higher level of content extraction. This set may contain filters such as an advertisement remover, a link list remover, a removed link retainer and/or an empty table remover. Other filters may also be applied, such as filters that allow the user to control font size and word wrapping of the output, and heuristic functions guiding the content extractor.

One filter than can be applied by the context extractor is an advertisement remover. For example, as the hierarchical data model is parsed, the values of the "src" and "href" attributes throughout the page may be analyzed to determine the servers to which the links refer. If an address matches against a list of common advertisement servers, that node of the hierarchical data model that contained the link may be removed. This process is similar to the use of an operating system-level "hosts" file which prevents a computer from connecting to advertiser hosts. The effectiveness of this method can be improved by periodically updating a blacklist of advertisers from a known source.

Another filter that can be applied by the context extractor is a link list remover. A link list remover may employ a filtering technique that removes all "link lists," which are bodies of content either in the page or within table cells for which the ratio of the number of links to the number of non-linked words is greater than a specific threshold (known as the link/text removal ratio). When the hierarchical data model parser encounters a table cell, the link list remover may tally the number of links and the number of non-linked words. The number of non-linked words may be determined by taking the number of letters not contained in a link and dividing it by the average number of characters per word, which can be preset (although it may be overridden by the user, or it could be derived from the specific webpage or web domain). If the ratio is greater than a link/text removal ratio (for example 0.35), the content of the table cell (and, optionally, the cell itself) may be removed. This algorithm may thus remove most long link lists that tend to reside along the sides of webpages, while leaving the text-intensive portions of the webpages intact.

Another filter that can be applied by the context extractor is an empty table remover. After other filters are applied, sometimes numerous tables remain that are either completely empty or have several empty cells, and that take up large swaths of space on the webpage. The empty table remover may remove tables that are empty of any "substantive" information. What constitutes "substantive" information can be determined by a user and input through settings or system defaults. The settings may determine which parts of the markup language text, such as the amount or types of tags, that should be considered to be of substance, and how many characters within a table are needed to be viewed as substantive. These thresholds can be set much like the word size or link-to-text ratio settings described above. The table remover may also check a table for substance after it has been passed through a filter. If a table has either no substance or less than some user defined threshold, it may be removed from the tree. This algorithm may thus remove any tables left over from previous filters that contain insubstantial amounts of unimportant information. This filter is preferably run towards the end of the filter functions to maximize its benefit.

An example of a filter that can add content to the markup language document is the removed link retainer. While the above-described filters remove content from the page, the removed link retainer may add link information back at the end of the document to keep the page browsable. The removed link retainer may keep track of all the text links that are removed throughout the filtering process. After the hierarchical data model is completely parsed, the list of removed links may be added to the bottom of the page. In this way, any important navigational links that were previously removed may remain accessible, and since the parser had parsed them initially as separate units, each menu or navigational link may be kept intact, and each link can be viewed without any loss of original setup or style.

After the entire page is parsed and modified appropriately, it may be sent to output filters 1150 as described with reference to FIG. 1. The output filters may produce output in a variety of formats and markup languages, such as, HTML, plain text, or WML. For example, a plain text output filter may remove all tags and retain only the text of the site while eliminating most white space. The result is a text document that contains the main content of the page in a format suitable for summarization, speech rendering or storage.

The operation of the content extractor and filters may be controlled by settings 2050. Settings 2050 can be stored in multiple ways, such as a file on permanent media or in memory. The settings may control all aspect of operation of the filters and content extractor. For example, settings may control the ratio for the link list remover or it may control what types of tags are considered substance for the empty table remover. Other examples are controlling the output filters and the output format, the network settings or the types of content to ignore. The settings can be changed using user interface 1060 in the manner described with reference to FIG. 1.

The operation of content extractor 1110 and the included filters may be controlled by a number of settings which can be changed by user interface 1060. User interface may be any type of interface such as a graphical or non-graphical interface. For example, user interface may be a series of webpages that allow a user to enter settings, a java application, a voice based interface incorporating voice recognition technology, or more simply a text editor and a data file containing settings. A more detailed description of an example user interface is given with respect to FIGS. 7A-7D.

The Classifier

The context extractor may allow a user to tune settings as described above. For example, filters 2040 may need to be manually configured by the user in order to effectively extract content from the requested content. These settings may need to be adjusted when the user moves from one class of markup language to another, for example. In order to reduce human involvement in selecting heuristic settings for the appropriate content extraction, a markup language text's classification can be used to automatically change the settings. The settings for a previously unknown markup language text can then be determined automatically by classifying it as sufficiently similar to a cluster of known markup language texts with previously adjusted settings. This may produce better content extraction results than a single one-size-fits-all set of setting defaults.

Classifier 2110 may be used to automate the application of filter settings for a varied range of websites by detecting the classification of markup language texts, which may be defined both by content genres and by physical layout.

For some types of markup language text, such as, HTML or WML, the layout of the rendered markup language text may be used for classifying and clustering the text. Markup language texts of the same genre tend to have similar layouts for various reasons, such as the expectations of users, and the need to present a certain type of information effectively.

For an embodiment of the invention directed toward websites, certain settings for the content extractor and filters work well for particular genres of websites. For example, news sites may share the same filter settings that produce the best extraction of content; these same settings may not work well with other genres like shopping, sports or astronomy.

The classifier may classify and cluster websites before the system is in operation (i.e. a preprocessing phase), and may classify and cluster a website that has not been classified during operation. Alternatively, clusters may be created while the system is in operation.

During the preprocessing phase, the classifier network interface 2120 may retrieve information from an Internet domain 2090 that will help classify requests for markup language text at that Internet domain. This information may be a website from a web server, or an index document from an online database. Additional information may be needed if all markup language texts at a particular domain are not classified similarly. For example, to classify markup language text within both the sports section and the finance section of an online news website, two requests for information may be used, one request to the root of the sports section and one request to the root of the finance section.

Additionally, during the preprocessing phase, classifier network interface 2120 may retrieve information from Internet domain data repository 2100. This data repository could be any data repository containing information about the Internet domain and/or related domains. In one embodiment, the data repository is a search engine which is queried with the Internet domain at which a website is hosted. The resulting markup language text returned by the search engine may be used by the classifier. Classifier network interface 2120 is only one way of obtaining the necessary related information; the same information may be stored locally, retrieved in advance, or retrieved simultaneously as other processing is done by separate components.

Identifier generator 2140 may use the information provided by classifier network interface 2120 to generate an identifier for each Internet domain that will be used to classify requests for markup language text.

Key words data repository 2130 may store the key words that are identified during the preprocessing phase. The identifier data repository stores the identifiers that are generated by the identifier generator 2140.

Predetermined settings 2060 may store settings for any particular classification of a website and may be used by classifier 2110 to change settings 2050. The predetermined settings data repository may contain settings that have been automatically determined, or that have been entered by a user/administrator who considers them to be "good" or "optimal" setting for a particular classification or classifications of markup language text. The data repositories shown within the classifier can be combined into one or more data repositories in any combination for implementation purposes, and further, do not have to be contained within the classifier 2110. They may be implemented using, for example, one or more data tables in a relational database.

Figure 3:
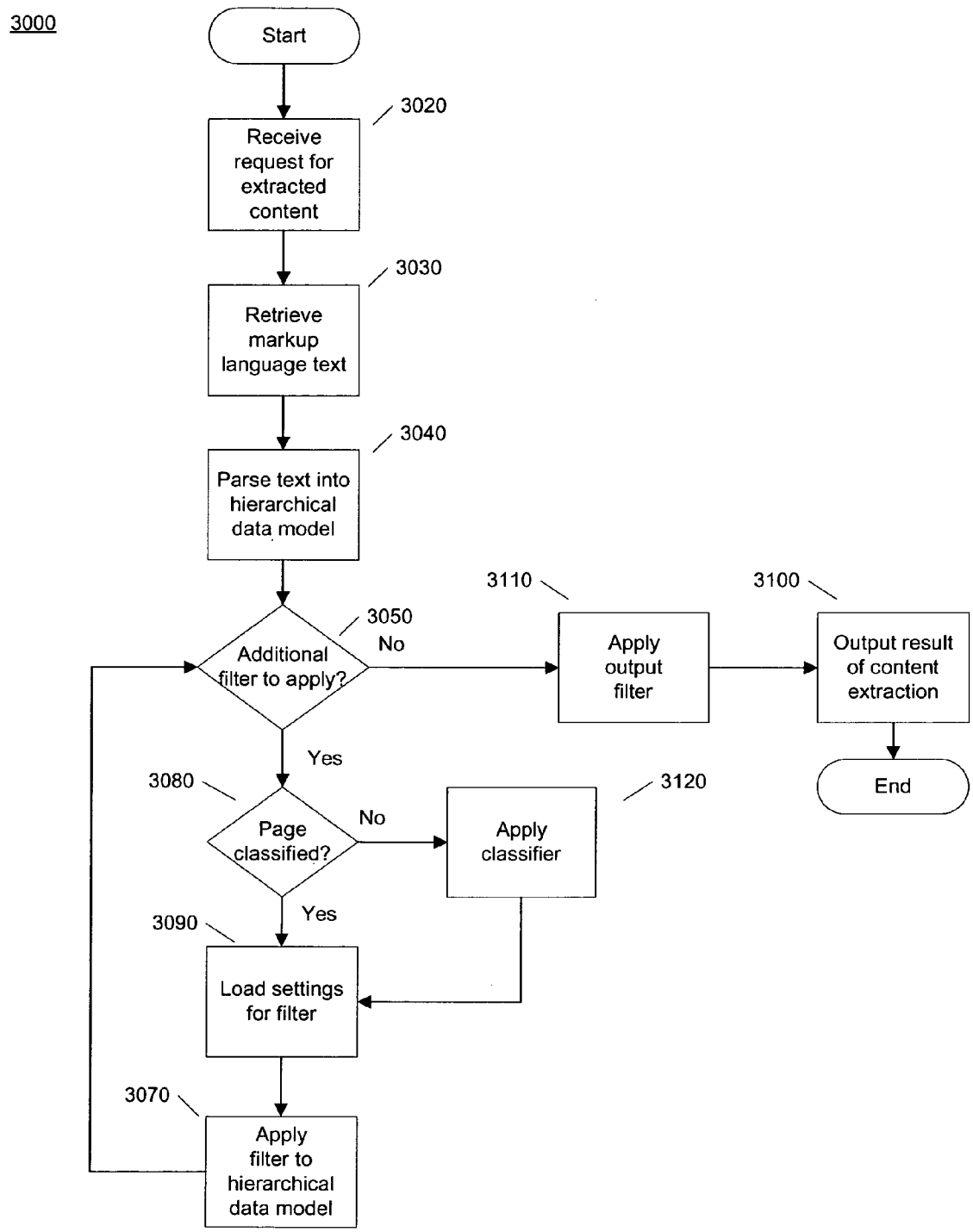
FIG. 3 is an example of a flow diagram for automatically extracting content from markup language documents in accordance with some embodiments of the present invention.

FIG. 3 is an example of a flow diagram 3000 for automatically extracting content from markup language text in accordance with some embodiments of the present invention.

At block 3020, a request is received from a client or another source for a content extracted version of particular markup language text, such as a website.

At block 3030, the content 1090 is retrieved through Internet 1020 and sent to content extractor 1110. Alternatively, caching techniques could be used to retrieve already-processed markup language text depending on the availability of the cached text and/or on the requirements for how frequently updated the content should be. For example, the HTTP protocol may contain headers for supporting caching operations that can be used for this purpose.

At block 3040, the parser 2020 may parse the retrieved markup language text into a hierarchical data model 2030. This hierarchical data model can be the Document Object Model standard of the W3C, or another hierarchical data model. At this point, the parser can also fix any errors in the input markup language text. This may be necessary because some popular web browsers also fix markup language text and present the best guess as to what was meant by the author, therefore allowing markup language text present at some websites to remain malformed without being corrected.

At block 3050 a determination may be made as to whether there are any filters 2040 to apply to the hierarchical data model. If there are filters to apply, process 3000 proceeds to block 3080, which may determine whether the markup language text has already been classified. If the markup language text has already been classified, the settings for the filter being applied that correspond to that markup language text may be loaded at block 3090 and the filter applied at block 3070.

If the markup language text has not been classified, then process 3000 proceeds to block 3120, which may apply the classifier and determine the appropriate settings to use with the particular filter. The settings may then be loaded at block 3090, and then the filter applied at block 3070.

At block 3090, if the classifier is unable to classify the markup language text or appropriate settings are not found, typically no change is made to the current settings for that filter. If the classifier is able to find appropriate settings, those settings may be used in addition to those entered by the user using the user interface. Alternatively, the manual settings by the user can override the automatic settings by the classifier, or vice versa. Further, user settings may also control when the classifier is unable to properly classify the page or to find appropriate settings.

Although at block 3090 settings may be loaded for the filter from data repository 2050, generally the settings will already be loaded into memory so no loading of settings will be necessary, setting can be retrieved directly from memory. However, actually loading setting from another storage area may be necessary if changes from the user or classifier have been made. This need to reload the setting can be communicated to the context extractor by a flag or other well-known method. Settings can also depend on the user of the system, and different profiles of settings may be stored and loaded depending on the particular user of the system.

After application of the filter at block 3070, the process 3000 proceeds back to the decision block 3050. If the last filter has been applied then at block 3070 any output filters may be applied to the hierarchical data model before the result of the filtering is output at block 3100.

At block 3070, the filter is applied to the data model. A variety of filters may be applied at 3070 including any of those described with reference to FIG. 2. For example, a filter may be applied by starting at the root node of the hierarchical data model, (an <HTML> tag for a DOM of a webpage), and proceed by parsing through each of the root node's children using a recursive depth first search function. A boolean variable can be set (i.e., mCheckChildren) to true to allow the filter process to check the children. A currently selected node is then passed through a method that analyzes and modifies a node based on a series of set preferences. At any time, the boolean variable mCheckChildren can be set to false, which allows an individual filter to prevent specific subtrees from being filtered. That is, certain filters may elect to produce the final result at a given node and not allow any other filters to edit the content after that. After the node is filtered accordingly, the filtering process is recursively run on child nodes if the mCheckChildren variable is still true.

A filtering method, for example, called passThroughFilterso, can perform the majority of the content extraction. It may begin by examining a node to see if it is a "text node" (data) or an "element node" (HTML tag). Element nodes may be examined and modified in a series of passes. In one pass any filters that edit an element node but do not delete it may be applied. For example, a filter that removes all table cell widths may be applied. In a separate pass, all filters that delete nodes from the hierarchical data model can be applied. Most of these filters are preferably prevented from recursively checking child nodes by setting mCheckChildren to false. In another pass, if a node is a text node, text filters may be applied. One example of pseudo-code for an empty table removing filter in accordance with some embodiments of the invention is:

```
procedure removeEmptyTables(iNode: node)
    if iNode.hasChildNodes( ) then
        next := iNode.getFirstChild( )
        while next != Ø begin
            current := next
            next := current.getNextSibling( )
            filterNode(current)
        end
    lengthForTableRemover := 0;
    empty :=processEmptyTable(iNode)
    if empty then
        iNode.getParentNode( ). removeChild(iNode)
```

Figure 4:
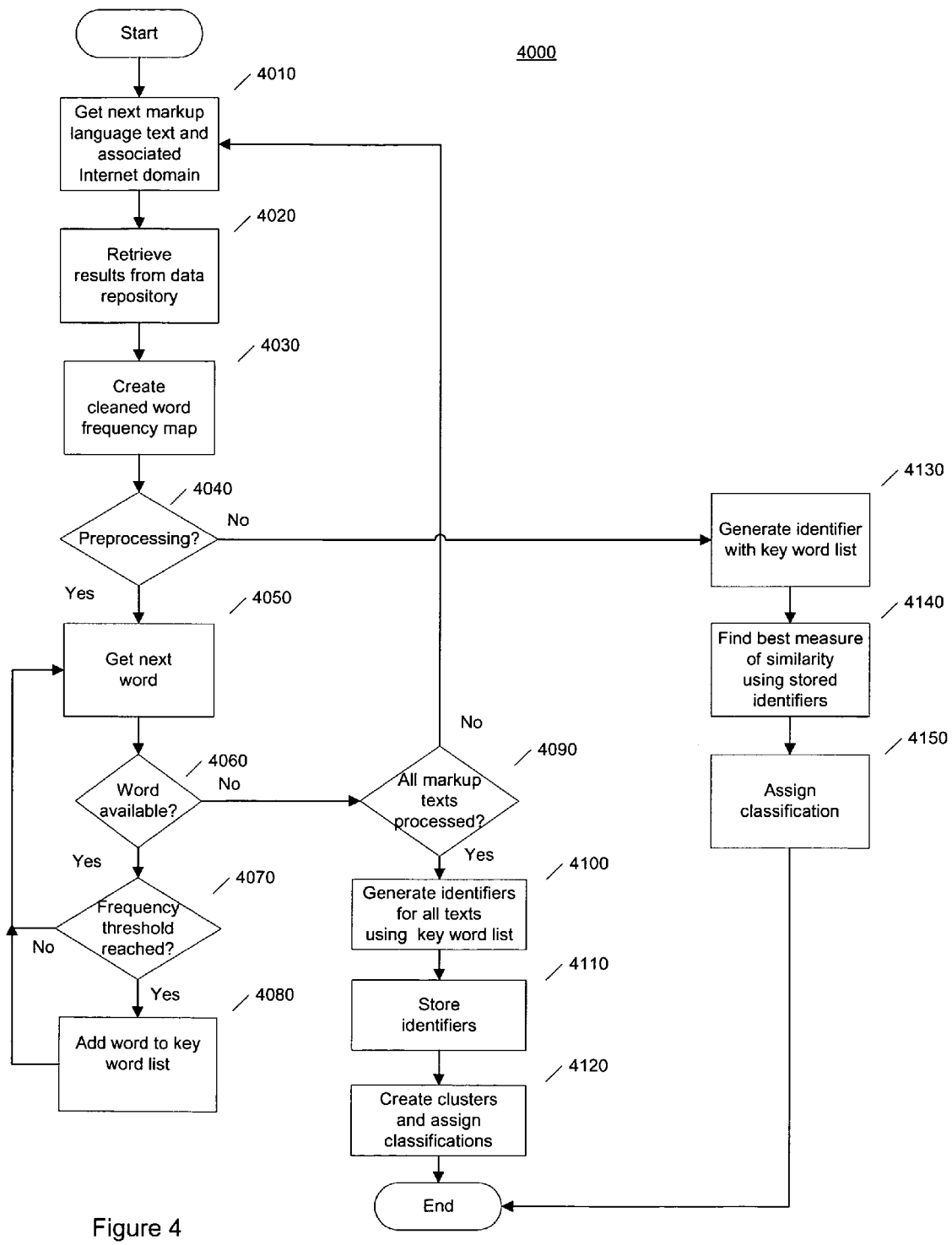
FIG. 4 is an example of a flow diagram showing the operation of the classifier in accordance with some embodiments of the present invention.

FIG. 4 is an example of a flow diagram showing the operation 4000 of a classifier in accordance with some embodiments of the present invention.

Both phases of classifier 2110 are shown. The classifier may classify and cluster markup language texts both before and during operation of the system. Alternatively, all classifying and clustering may be done during operation of the system. However, the use of two phases does offer practical advantages.

In an embodiment of the invention as a web proxy server, detection of the content genre may need to be done in near real-time, for the overall content extraction to be done in a reasonable amount of time. Performing genre-analysis on individual documents in real-time can be extremely computationally expensive. But, if the content extraction proxy already has data on the existence of various genre clusters (and the various heuristic filter settings that work well for those genres) then matching individual websites to those clusters and applying the appropriate settings can be done efficiently.

The preprocessing phase of process 4000 starts at block 4010, where the markup language text associated with the first Internet domain being classified is retrieved. For example, this may be retrieving a webpage from a web server or it may be retrieving an XML page from an online database. The preprocessing phase may be run continually or periodically while the system is in operation to increase the number of classified markup language texts, and to improve the created clusters. This increases the likelihood that good settings will be found for unclassified markup language text requested by a client.

At block 4020, additional information regarding the Internet domain is retrieved from Internet domain data repository 2100. As described before, this could be the result of a query to a search engine or other database that contains information about the Internet domain. In one embodiment of the invention the results (defined as "snippets") generated by sending a website's domain name to search engines is used. These snippets increase the frequency of function words that directly assist in detecting the genre of a website, and may also allow for easier clustering of websites. Snippets may be descriptive of the function of the websites being accessed and add relevant knowledge in the form of function words, which may then be used in the analysis of the appropriate genre. Multiple queries and/or querying multiple data repositories can be used to retrieve more information, for example when markup language text within an Internet domain is to be classified separately.

At block 4030, a word frequency map of the retrieved markup language text and of the information retrieved at block 4020 may be created. A frequency map may list each word along with the number of times it appears in the data for which the map is being created. After the frequency map is created, it may be cleaned by removing all words deemed insignificant. For this purpose, a "stop word list" can be used that contains words that typically are parts of speech (prepositions, articles, pronouns, etc.), and other words that may appear frequently in a document but that do not add information to the genre of the site. Further, all non-dictionary words can be removed, including their variations, including some of common prefixes, suffixes and tenses.

At block 4040, a determination may be made as to whether the classifier is being used during preprocessing or during operation. If the classifier is being used during preprocessing process 4000 proceeds to block 4050.

At block 4050, a process for creating a key word list begins. Within this subprocess rules may be used to select words. For example, from the frequency maps, words that appear frequently, for example greater than 10 times, and unique words, may be added to a key word list. Other rules may also be used. This way words that are key for classifying and clustering the markup language text may be found.

At block 4050, the next word is retrieved, and at decision block 4060 a determination may be made as to whether the last word has been reached. If it has, then a determination may be made at 4090 as to whether all markup language texts have been processed. Otherwise, process 4000 may determine at block 4070 whether a particular word has appeared frequently enough (or just once) to be added to the key word list.

At block 4080, the word is added to the key word list and process 4000 proceeds back to block 4050 to retrieve the next word in the markup language text and the other information that is being processed.

Once all the words have been processed, process 4000 may check at block 4090 if there are any additional markup language texts and Internet domains to be processed. If there are additional markup language texts to be processed, process 4000 begins processing the next Internet domain at 4010. Otherwise, an identifier for each of the Internet domains may be generated at block 4100.

Identifiers may be generated by re-analyzing the frequency maps using the key word list. This analysis with a new set of keywords may produce an accurate content genre identifier for each of the websites. These identifiers may then be stored at block 4110.

Finally, at block 4120 clusters may be created and classifications assigned to each of the Internet domains. In order to perform clustering, the distance of each identifier from all the other identifiers may need to be determined. One method of doing this is using the Euclidean distance. Once all the distances are computed, the Internet domain can be sorted by distance to create a list of Internet domains that range from closest association to furthest. A hierarchical clustering algorithm such as that described in Peter Willett "Recent Trends in Hierarchic Document Clustering: A Critical Review", Journal Information Processing and Management, 1988, which is hereby incorporated by reference herein in its entirety, can be used to perform clustering.

After creation (or update) of the clusters, a genre is assigned to each member within the cluster. The clusters created may be manually tagged by the appropriate genre and the heuristic settings that produce effective content extraction, or the genre and settings may automatically be assigned. If the settings for any member within the cluster have previously been assigned, these settings may be assigned to any additional member of the cluster. Further, the genre of a cluster could be automatically assigned an internal code, for example, cluster 1, cluster 1, etc. A more useful cluster genre may later be added by a user/administrator.

The Manhattan histogram distance measure algorithm may be used to measure the distance between a website in question and the original classifications. The formula is defined $$D_1(h_1, h_2) = \sum_{i=0}^{n-1} |h_1[i] - h_2[i]|$$

A histogram (h1, h2) is represented as a vector, where n is the number of bins in the histogram (i.e., the number of words in the key word list). Variables h1 and h2 are first normalized in order to satisfy the above distance function requirements. The sum of the histogram's bins is normalized before computing the distance. The settings associated with the website whose distance is closest to the one being accessed are assigned to the unclassified website.

Another way of determining the distance (which is one way of measuring the similarity of identifiers) is the Euclidean distance $$D_2(h_1, h_2) = \sum_{i=0}^{n-1} (h_1[i] - h_2[i])^2$$

Yet another way of determining the distance is the Mahalanobis histogram distance formula, which is defined as:

$$d^2(x,\bar{y}) = (x-\bar{y})C^{-1}(x-\bar{y})$$

Where x and y are two feature vectors, and each element of the vector is a variable. The variable x is the feature vector of the new observation, the variable y is the averaged feature vector computed from the training examples, and $C^{-1}$ is the inverse covariance matrix, where $$C_{ij}=Cov(y_i,y_j)\cdot y_i,y_j$$

are the $i^{th}$ and $j^{th}$ elements of the training vector. The advantage of Mahalanobis distance is that it takes into account not only the average value, but also its variance, and the covariance of the variables measured.

Once the distance between any two sites is determined, clusters may be found based on the assumption that similar sites contain similar words. In one embodiment of the invention, a clustering method may be used that is a slight variation on a hierarchical clustering algorithm, each cluster may be viewed as a tree with the closest pair of sites as its root. Starting with the closest pair of sites, the algorithm may select the next-closest available pair of sites at each iteration from the set of sorted site distances. If neither site belongs to an existing cluster, the sites become the root of a new cluster. However, root sites may pull in additional websites into the cluster if the algorithm encounters a pair of sites where one is the root and the other is not already clustered. A website that is pulled in directly by the root may pull in additional sites. However, any site that was not clustered directly by the root of that cluster may not pull in any other site, even if the algorithms encounters a site not yet been clustered. This restriction is imposed in order to prevent chains of more than three sites from forming in the same cluster, which ultimately prevents all the clusters from merging into one gigantic one. Websites associated with the root via more than one link are often far enough to be potentially closer to a different cluster. In many cases, websites that were initially rejected are still pulled into a cluster by a site that is directly connected to the root.

If the algorithm encounters a pair of sites which belong to different clusters, it simply proceeds to the next iteration since each of these sites was found to be closer to one classification than the other. The algorithm may halt when the distance between the next pair of sites exceeds a preset threshold or when all possible pairs of sites have been examined. This threshold is used in order to prevent extremely unrelated sites from contaminating existing clusters. These sites are either manually inserted into an existing genre cluster or form their own cluster.

An example of results achievable using the classifying and clustering of process 4000 on 200 unique sites is shown the Table 1 below. The data repositories used for this example were the search engines Google, Yahoo, Dogpile, MSN, Altavista and Excite.

TABLE 1

|  | Using Snippets | Without Snippets |
| --- | --- | --- |
| No. of Sites | 171 | 171 |
| No. Search Engines | 6 | 0 |
| No. Clusters Found | 14 | 5 |
| Max. Cluster Size | 71 | 159 |
| Min. Cluster Size | 2 | 2 |
| Avg. Cluster Size | 12.21 | 34.2 |
| Time to cluster (min) | 25 | 11 |

Table 1 shows that using snippets reduces the size of detected clusters. While using snippets increases the runtime of the system, the addition was mainly due to the increase in access time for gathering data from six more sites for each website being clustered. Compared to manual clustering, it was found that using snippets categorized sites extremely accurately.

TABLE 2

|  | Using Snippets | Without Snippets |
| --- | --- | --- |
| No. of Sites | 171 | 171 |
| No. Search Engines | 6 | 0 |
| No. Clusters Found | 14 | 5 |
| Max. Cluster Size | 71 | 159 |
| Min. Cluster Size | 2 | 2 |
| Avg. Cluster Size | 12.21 | 34.2 |
| Time to cluster (min) | 25 | 11 |

Table 2 shows some of the top clusters that were created by applying process 4000. Additionally, the experiments showed that process 4000 performs well compared to clustering by a human. Overall, using snippets produces results that are far better than the approach without, and far more in tune with what is observed upon human-based inspection.

Figure 8:
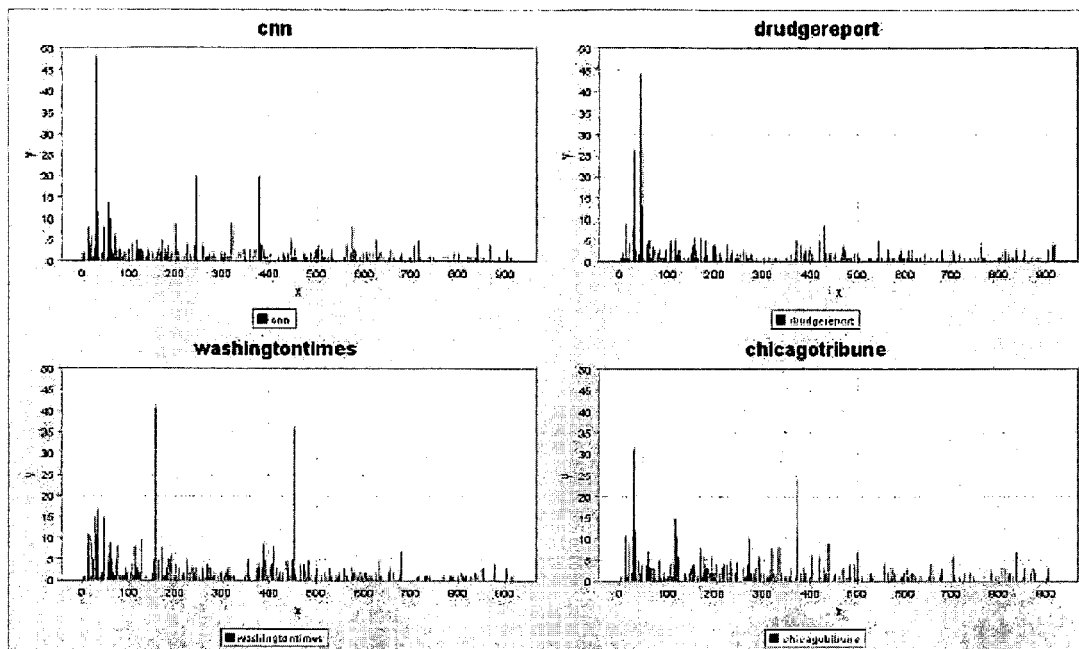
FIG. 8 is a graphical view of an example set of identifiers in accordance with some embodiments of the invention.

FIG. 8 is a graphical view of an example set of identifiers in accordance with some embodiments of the invention. The graphs were generated from identifiers computed using process 4000 and actual markup language text from a website and associated information from search engines. FIG. 8 shows the general similarity of four example websites that were determined as being part of a cluster (CNN.com, drudgereport.com, washingtontimes.com and chicagotribune.com). For these types of international news sites, the settings for a context extractor could be used to remove links and advertisements as shown with reference to FIGS. 5 and 6.

At decision block 4040, during operation of the system, the method proceeds to block 4130 instead of going to block 4050. At block 4130, an identifier for the Internet domain at which the requested content resides is generated using the key word list.

At block 4140, the best match for this identifier is found. This can be done using the same distance finding method as described above or a different method may be used during operation.

At block 4150, the classification of the identifier that was found to be the best match at block 4140 is assigned as the classification of the unclassified Internet domain.

Alternatively, in process 4000, in embodiments of the invention directed towards processing web pages, referrer information may be used to classify markup language texts. As a substitute, or in addition to using the Internet domain, the Internet domain specified in a referrer HTTP header may be used to retrieve snippets and/or markup language text for processing. Corresponding searches could be performed in a data repository to retrieve information associated with the referrer information.

An additional method for determining the content to be extracted in markup language text is using tree pattern inference. This is a technique that may be used to identify common parts in the hierarchical data model of a highly structured web page, which may be used to develop a system for inferring reusable patterns. In Hogue et al., "Tree Pattern Inference and Matching for Wrapper Induction on the World Wide Web, Massachusetts Institute of Technology, 2003," which is hereby incorporated by reference in its entirety, there is described a method for learning patterns from a set of positive examples, to retrieve semantic content from tree-structured data. Specifically, Hogue focuses on HTML documents on the World Wide Web which contain a wealth of semantic information and have a useful underlying tree structure. A user provides examples of relevant data they wish to extract from a web site through a simple user interface in a web browser. To construct patterns, they use the notion of the edit distance between subtrees to distill them into a more general pattern. This pattern may then be used to retrieve other instances of the selected data from the same page or other similar pages. By linking patterns and their components with semantic labels using RDF (Resource Description Framework), semantic "overlays" for web information may be created.

The Resource Description Framework (RDF) integrates a variety of applications from library catalogs and world-wide directories to syndication and aggregation of news, software, and content to personal collections of music, photos, and events using XML as interchange syntax. The RDF specifications provide a lightweight ontology system to support the exchange of knowledge on the Web. This same technique may be used to determine similarities between similarly structured web pages (most likely from the same website), with the assumption that the dissimilar parts on the webpage are the actual content.

Figure 5:
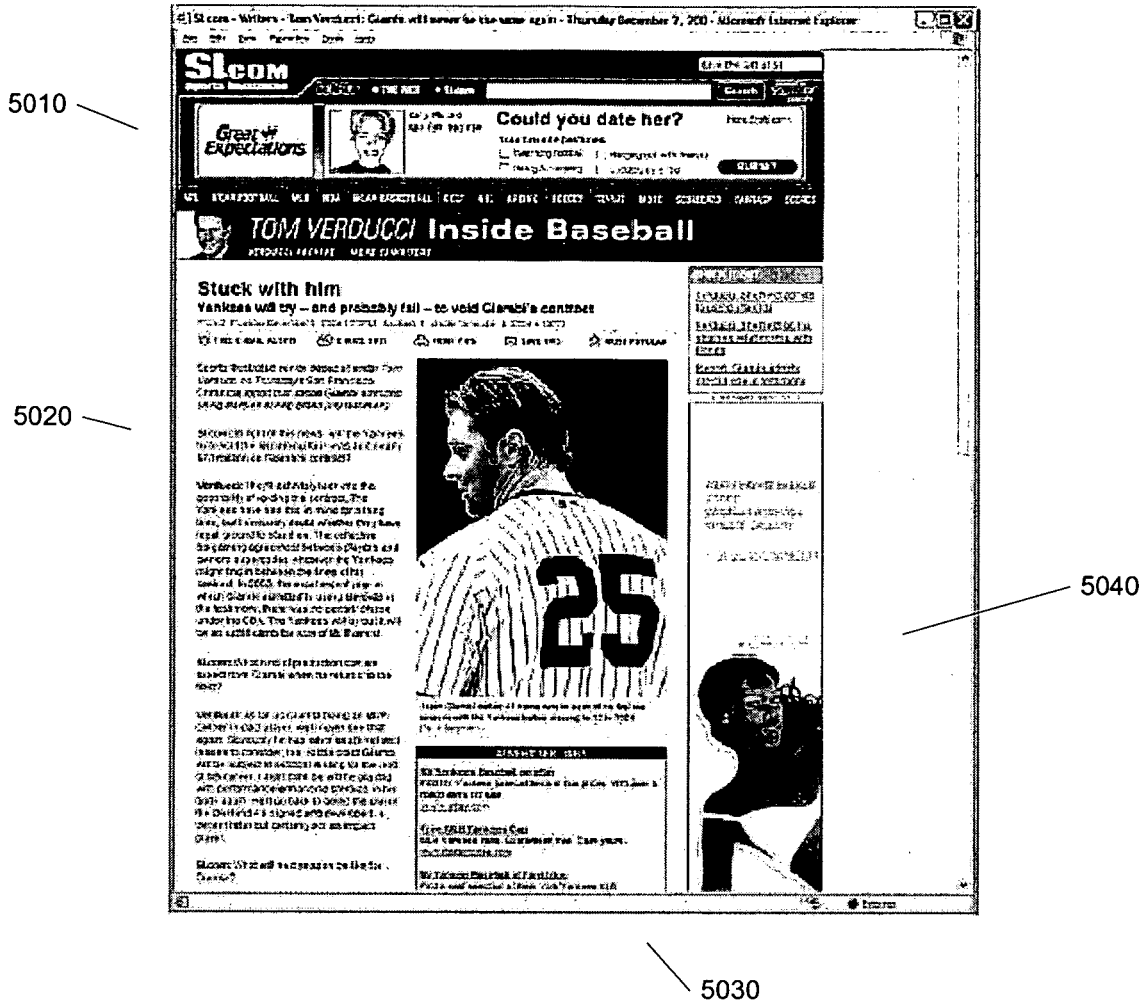
FIG. 5 is an example of a webpage with navigational and other clutter.
Figure 6:
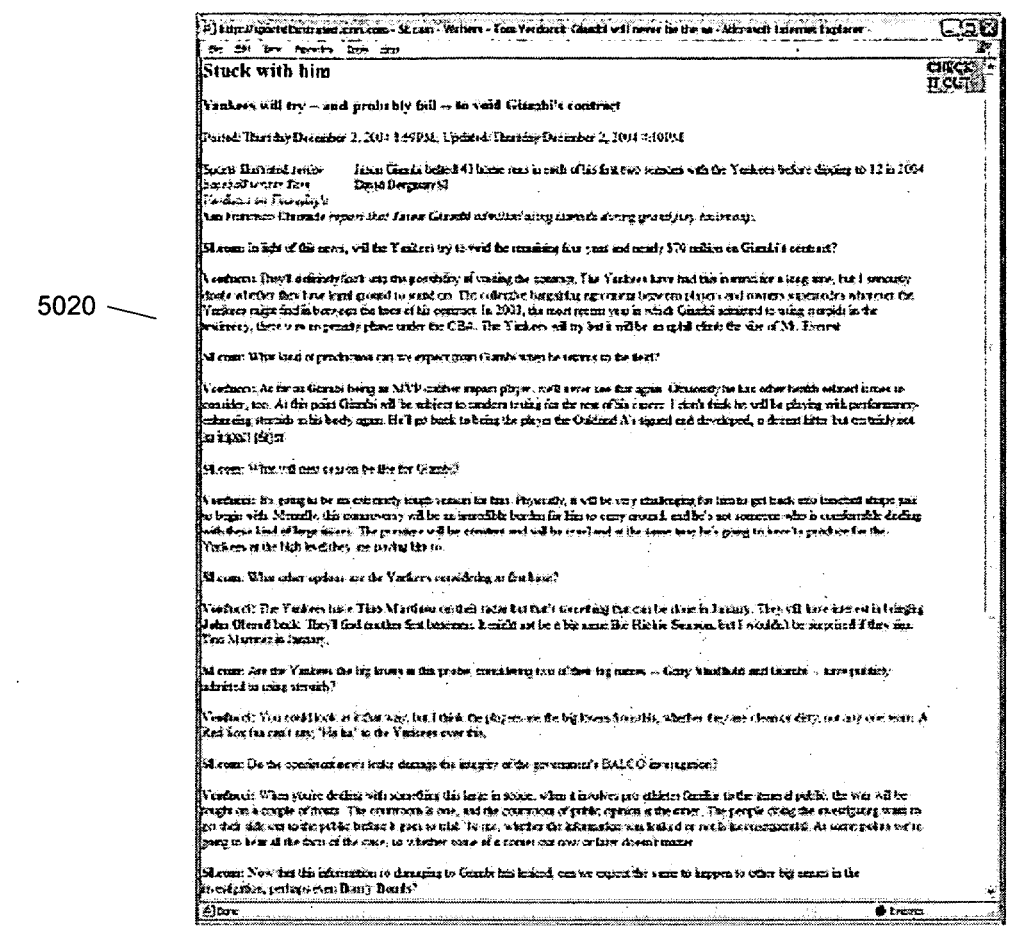

FIG. 6 shows the webpage of FIG. 5 after some embodiments of the invention have been applied. For example, the list of advertisement links 5030 below the image related to the content has been removed, as well as banner advertisements 5010 and 5040. The webpage now consists mainly of the content 5020 that the user most is likely interested in reading.

Figure 7A:
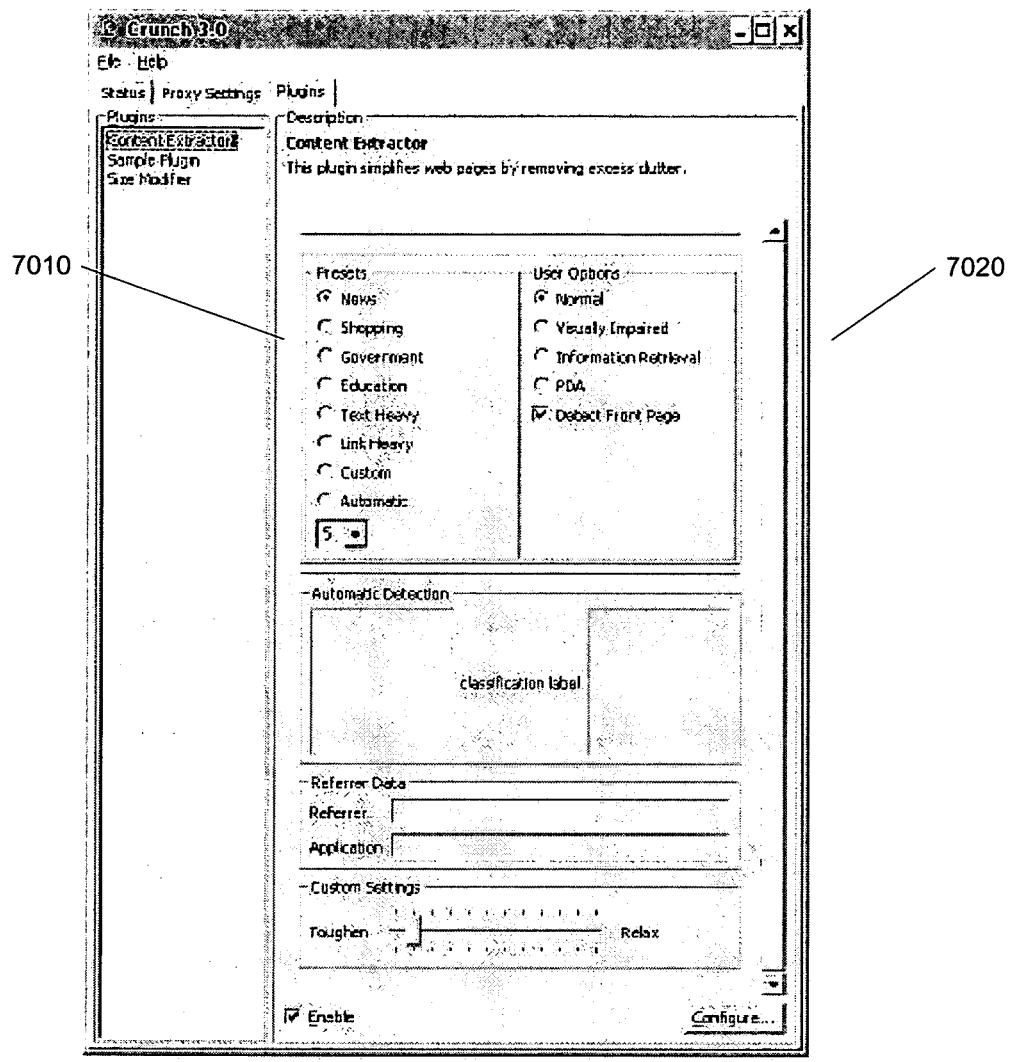
FIG. 7A is an example of a user interface for changing the settings for a content extractor in accordance with some embodiments of the invention.

FIG. 7A shows a user interface for changing the settings for a content extractor in accordance with some embodiments of the invention. The ability to switch to a predetermined set of settings is shown by 7010. The settings for adjusting the operation of the content extractor is shown by 7020.

Figure 7B:
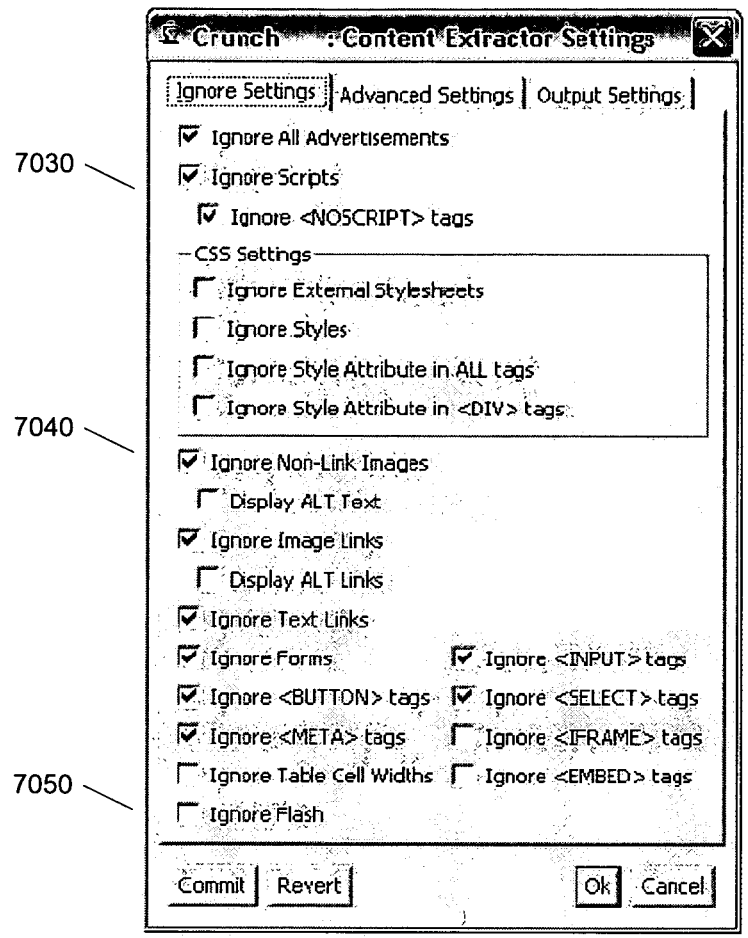
FIG. 7B is an example of a user interface for changing the settings for a first set of filters in accordance with some embodiments of the invention.

FIG. 7B shows a user interface for changing the settings for a first set of filters in accordance with some embodiments of the invention. These settings relate to a first set of filters that may remove content from markup language text such as images 7040, programming script 7030, and animation 7050.

Figure 7C:
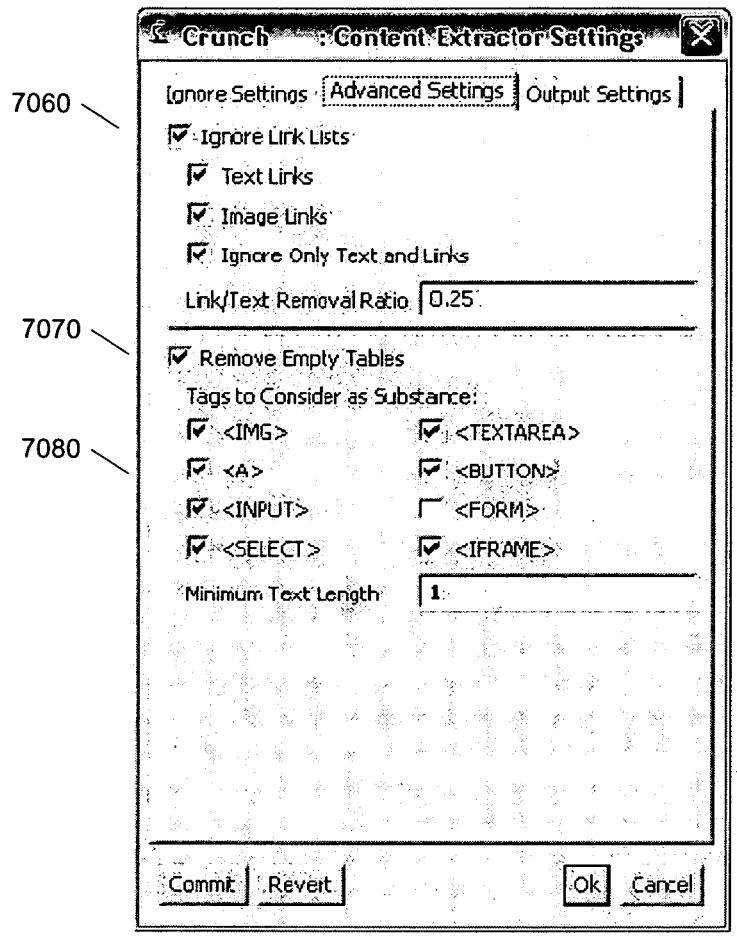
FIG. 7C is an example of a user interface for changing the settings for a second set of filters in accordance with some embodiments of the invention.

FIG. 7C shows a user interface for changing the settings for a second set of filters in accordance with some embodiments of the invention. Settings 7060 for a link-list remover are shown, including the ability to remove both text links and/or image links. Settings 7070 are also shown for an empty table remover, including more detailed settings 7080 for adjusting what tags to consider as substance when filtering markup language text.

Figure 7D:
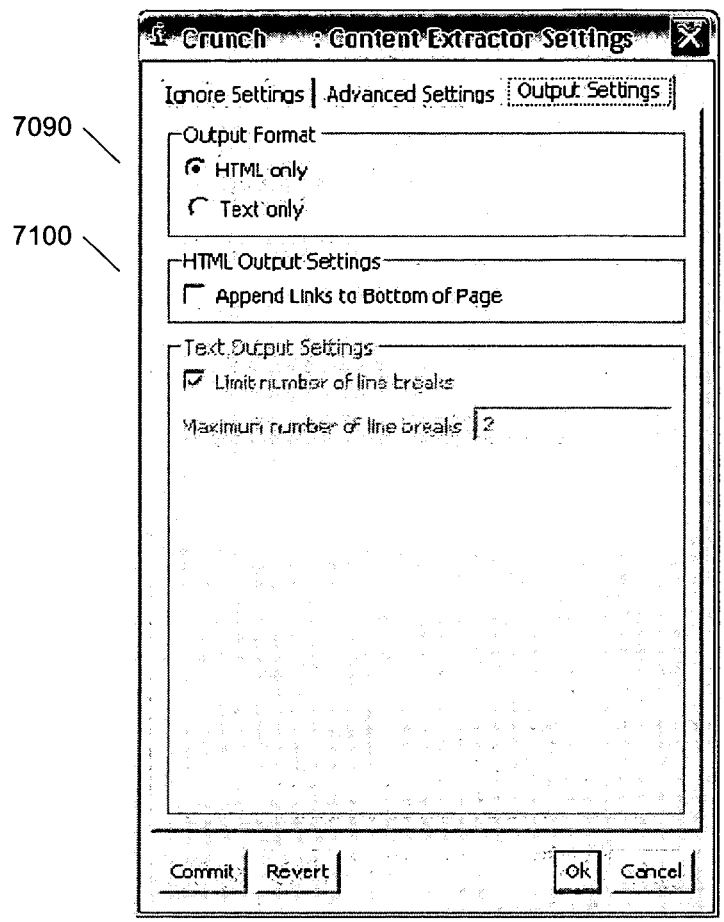
FIG. 7D is an example of a user interface for changing the settings for an output filter in accordance with some embodiments of the invention.

FIG. 7D shows a user interface for changing the settings for an output filter in accordance with some embodiments of the invention. The output filter settings 7090 allow output in either HTML or text. Additional settings and output formats may also be provided. Settings 7100 are also shown for a removed link retainer.

Other embodiments, extensions and modifications of the ideas presented above are comprehended and within the reach of one versed in the art upon reviewing the present disclosure. Accordingly, the scope of the present invention in its various aspects should not be limited by the examples and embodiments presented above. The individual aspects of the present invention and the entirety of the invention should be regarded so as to allow for such design modifications and future developments within the scope of the present disclosure. The present invention is limited only by the claims that follow.

What is claimed is:

1. A method for extracting content from input markup language text comprising:

(a) classifying, by a computer, the input markup language text into a classification;
(b) after classifying the input markup language text, parsing, by the computer, the input markup language text into a first hierarchical data model;
(c) generating, by the computer, a second hierarchical data model based on the first hierarchical data model, using one or more filters to remove content from the first hierarchical data model, wherein at least one setting of the one or more filters controls the removal of content from two or more portions of the first hierarchical data model, and wherein the at least on setting is selected based on the classification of the input markup language text; and
(d) generating, by the computer, output markup language text from the second hierarchical data model,
wherein one of the one or more filters removes at least one of tables, programming script, styles and image links from the first hierarchical data model based on one or more predetermined rules,
wherein one of the one or more predetermined rules is removing tables containing less than a threshold number of characters, and
wherein one of the one or more predetermined rules is removing image links that have a source equivalent to any source within a set of blocked sources.

2. The method of claim 1, wherein one of the one or more filters removes content from the first hierarchical data model using a ratio of the number of links to the number of non-linked words.

3. The method of claim 2, further comprising adding content to the second hierarchical data model corresponding to the content removed from the first hierarchical data model by one of the one or more filters.

4. The method of claim 3, wherein the content added to the second hierarchical data model is a plurality of links.

5. The method of claim 4, further comprising comparing the first hierarchical data model to the second hierarchical data model and ignoring the result of a filter pass based on the comparison.

6. The method of claim 1, wherein the classifying is done using clustering.

7. The method of claim 1, wherein the output markup language text generated from the second hierarchical data model is in a different markup language than the input markup language text.

8. A system for extracting content from input markup language text comprising:

at least one computer that:
(a) classifies the input markup language text into a classification;
(b) after classifying the input markup language text, parses the input markup language text into a first hierarchical data model;
(c) generates a second hierarchical data model based on the first hierarchical data model using one or more filters to remove content from the first hierarchical data model, wherein at least one setting of the one or more filters controls the removal of content from two or more portions of the first hierarchical data model, and wherein the at least on setting is selected based on the classification of the input markup language text; and
(d) generates output markup language text from the second hierarchical data model,
wherein one of the one or more filters removes at least one of tables, programming script, styles and image links from the first hierarchical data model based on one or more predetermined rules, wherein one of the one or more predetermined rules is removing tables containing less than a threshold number of characters, and wherein one of the one or more predetermined rules is removing image links that have a source equivalent to any source within a set of blocked sources.

9. The system of claim 8, wherein one of the one or more filters removes content from the first hierarchical data model using a ratio of the number of links to the number of non-linked words.

10. The system of claim 9, wherein the at least one computer also adds content to the second hierarchical data model corresponding to the content removed from the first hierarchical data model by one of the one or more filters.

11. The system of claim 10, wherein the content added to the second hierarchical data model is a plurality of links.

12. The system of claim 11, wherein the at least one computer also compares the first hierarchical data model to the second hierarchical data model and ignores the result of a filter pass based on the comparison.

13. The system of claim 8, wherein the classifying is done using clustering.

14. The system of claim 8, wherein the output markup language text generated from the second hierarchical data model is in a different markup language than the input markup language text.

15. A non-transitory computer-readable medium containing computer-executable instructions that, when executed by a processor, cause the processor to perform a method for extracting content from input markup language text, the method comprising:

(a) classifying the input markup language text into a classification;

(b) after classifying the input markup language text, parsing the input markup language text into a first hierarchical data model;

(c) generating a second hierarchical data model based on the first hierarchical data model using one or more filters to remove content from the first hierarchical data model, wherein at least one setting of the one or more filters controls the removal of content from two or more portions of the first hierarchical data model, and wherein the at least on setting is selected based on the classification of the input markup language text; and (d) generating output markup language text from the second hierarchical data model, wherein one of the one or more filters removes at least one of tables, programming script, styles and image links from the first hierarchical data model based on one or more predetermined rules, wherein one of the one or more predetermined rules is removing tables containing less than a threshold number of characters, and wherein one of the one or more predetermined rules is removing image links that have a source equivalent to any source within a set of blocked sources.

16. The non-transitory computer-readable medium of claim 15, wherein one of the one or more filters removes content from the first hierarchical data model using a ratio of the number of links to the number of non-linked words.

17. The non-transitory computer-readable medium of claim 16, wherein the method further comprises adding content to the second hierarchical data model corresponding to the content removed from the first hierarchical data model by one of the one or more filters.

18. The non-transitory computer-readable medium of claim 17, wherein the content added to the second hierarchical data model is a plurality of links.

19. The non-transitory computer-readable medium of claim 18, wherein the method further comprises comparing the first hierarchical data model to the second hierarchical data model and ignoring the result of a filter pass based on the comparison.

20. The non-transitory computer-readable medium of claim 15, wherein the classifying is done using clustering.

21. The non-transitory computer-readable medium of claim 15, wherein the output markup language text generated from the second hierarchical data model is in a different markup language than the input markup language text.

* * * * *